US012591609B1

(12) United States Patent (10) Patent No.: US 12,591,609 B1
Srivastava et al. (45) Date of Patent: Mar. 31, 2026

(54) MULTIMODAL SEARCH AND RETRIEVAL SYSTEM

(71) Applicant: Typeface Inc., Palo Alto, CA (US)

(72) Inventors: Siddharth Srivastava, New Delhi (IN);
Aditya Dhaulakhandi, Dehradun (IN);
Harshvardhan Pratap Singh, Kanpur
Dehat (IN); Neeraj Matiyali, Haldwani
(IN); Xinyu Zhao, Santa Clara, CA
(US); Gaurav Sharma, Newark, CA
(US)

(73) Assignee: Typeface Inc., Palo Alto, CA (US)

( * ) Notice: Subject to any disclaimer, the term of this
patent is extended or adjusted under 35
U.S.C. 154(b) by 0 days.

(21) Appl. No.: 19/251,459

(22) Filed: Jun. 26, 2025

(51) Int. Cl.
*G06F 16/30* (2019.01)
*G06F 16/334* (2025.01)
*G06F 16/383* (2019.01)
*G06F 40/30* (2020.01)

(52) U.S. Cl.
CPC ........ *G06F 16/3347* (2019.01); *G06F 16/383*
(2019.01); *G06F 40/30* (2020.01)

(58) Field of Classification Search
CPC ..... G06F 16/3347; G06F 16/383; G06F 40/30
See application file for complete search history.

(56) References Cited

U.S. PATENT DOCUMENTS 12,321,401 B1 * 6/2025 Lee ...................... G06F 3/0488
2012/0117051 A1 * 5/2012 Liu ................... G06F 16/90335
707/707
2019/0294692 A1 * 9/2019 Zhao ..................... G06F 16/951
2023/0029278 A1 * 1/2023 Parush Tzur ....... G06F 16/7328
2023/0169758 A1 * 6/2023 Olechowski, III ..... G06V 30/10
382/159
2024/0045904 A1 * 2/2024 Tiwari ................. G11B 27/036
2024/0134908 A1 * 4/2024 Mahfuz ................ G06F 16/638
2024/0220530 A1 * 7/2024 Wilkins ............... G06F 16/433
2024/0220735 A1 * 7/2024 Gray ..................... G06F 40/56
(Continued)

OTHER PUBLICATIONS

Article entitled "OnviVec: Learning robust representations with
cross modal sharing", by Srivastava et al., dated Jan. 8, 2024 (Year:
2024).*

*Primary Examiner* — Mahesh H Dwivedi
(74) *Attorney, Agent, or Firm* — Schwegman Lundberg &
Woessner, P.A.

(57) ABSTRACT

A Multimodal Search System (MSS) is designed to enable
accurate search and retrieval across different modalities of
data, including images, videos, and text. The MSS leverages
multimodal and domain-specific models to extract and rep-
resent features and information from multimodal data,
enabling seamless querying using text-based search queries.
The MSS integrates multiple pipelines, including feature
vector-based and tag-based approaches, to ensure robust and
scalable search capabilities. The MSS addresses current
multimodal-search challenges by leveraging a hybrid
approach that combines multimodal embeddings, text
embeddings, and semantic tagging to enable cross-modal
searching. Additionally, for visual data, both tagging and
embedding techniques are integrated within a single modal-
ity, ensuring a comprehensive and accurate representation.
By assembling multiple retrieval strategies, the solution
harnesses the strengths of each, resulting in a balanced and
effective search system.

20 Claims, 9 Drawing Sheets

(56) References Cited

U.S. PATENT DOCUMENTS

2024/0419724 A1* 12/2024 Wilson ................... H04W 4/44
2025/0190503 A1*  6/2025 Lee ..................... G06F 16/9535
2025/0225558 A1*  7/2025 Subramanian ..... G06Q 30/0627

* cited by examiner

500

RECEIVE REQUEST TO GENERATE CONTENT — 502

SEARCH FOR ITEMS BASED ON THE REQUEST — 504

SELECT ONE OR MORE SEARCH RESULTS — 506

GENERATE PROMPT BASED ON THE SELECTED SEARCH RESULTS AND THE REQUEST — 508

GENERATE ONE OR MORE ITEMS — 510

CONTENT GENERATION WITH GENERATIVE ARTIFICIAL INTELLIGENCE

FINE TUNE GAI MODEL WITH USER DATA — 714

GENERATIVE ARTIFICIAL INTELLIGENCE MODEL — 712

GENERATED ITEM — 716

CONTENT POSTPROCESSING — 718

PROCESSED NEW ITEM — 720

GAI PROMPT — 710

PROMPT GENERATOR — 708

PROMPT TEMPLATE — 702

USER DATA — 704

USER PROMPT — 706

PROMPT CORPUS — 722

MULTIMODAL SEARCH AND RETRIEVAL SYSTEM

CROSS-REFERENCE TO RELATED APPLICATIONS

This application is related to U.S. patent application Ser. No. 19/202,913, filed May 8, 2025, and entitled "Unified Transformer Network for Learning Representations from Multiple Modalities Using Multimodality Pretraining and Multiple Tasks," which is incorporated herein by reference.

TECHNICAL FIELD

The subject matter disclosed herein generally relates to methods, systems, and machine-readable storage media for searching items of different types, referred to herein as modalities.

BACKGROUND

In the field of multimodal search and retrieval technologies, there is a growing need to efficiently search and retrieve data across diverse modalities, such as images, videos, audio, and text, within large-scale datasets. Current systems often lack the capability to perform cross-modal searches, where a query in one modality can retrieve relevant results in another. This limitation creates inefficiencies and restricts the ability to leverage the full potential of multimodal data.

The problem manifests in scenarios where users need to locate specific content within extensive datasets. For example, a user may wish to retrieve a video segment based on a textual description or find an image that corresponds to an audio clip. Existing systems struggle to provide accurate and coherent results in such cases. Errors include mismatched or irrelevant results, slow retrieval times, and an inability to handle complex queries involving brand-specific content, emotional context, or domain-specific metadata.

Platforms for media asset management or content creation often require advanced semantic understanding and indexing capabilities to process and retrieve data effectively. The problem is exacerbated by the lack of standardized methods for generating embeddings and metadata that can represent the semantic features of multimodal data comprehensively.

The impact of this problem is significant. Users face challenges in locating relevant content, leading to inefficiencies in workflows and reduced productivity. For instance, in the context of video creation, users may struggle to find specific clips or assets, delaying project timelines and increasing operational costs. Failure to address this problem limits the scalability and usability of multimodal data systems, hindering their adoption in industries reliant on large-scale data processing.

Potential causes of the problem include the absence of robust models for generating multimodal embeddings, insufficient mechanisms for extracting and indexing metadata, and inadequate methods for matching and ranking results across modalities. The complexity of handling diverse data types and ensuring semantic coherence further contributes to the issue.

Existing solutions have attempted to address the problem by employing basic embedding generation techniques and traditional search algorithms. However, these approaches often fall short in handling cross-modal queries and fail to provide the level of accuracy and relevance required for practical applications. Partial fixes, such as manual tagging or limited metadata extraction, have been implemented but are labor-intensive and lack scalability.

BRIEF DESCRIPTION OF THE DRAWINGS

Various appended drawings illustrate examples of the present disclosure and cannot be considered limiting its scope.

DETAILED DESCRIPTION

Figure 1:
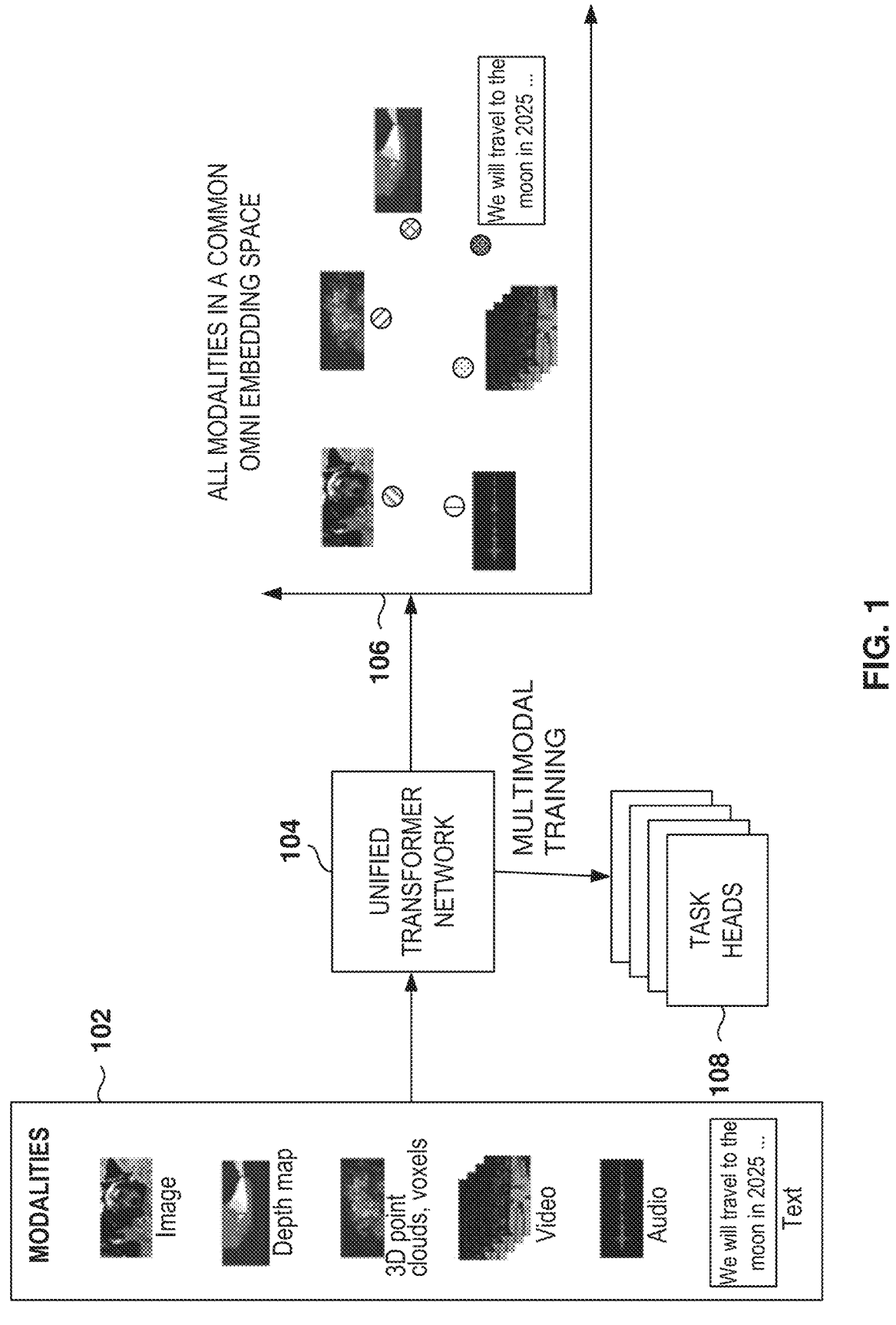
FIG. 1 illustrates the process of creating a unified transformer network for learning representations from multiple modalities using multimodality pretraining and multiple tasks, according to some examples.

Example methods, systems, and computer programs described herein are directed at searching multimodal items based on an input that may include one of several modalities. Examples merely typify possible variations. Unless explicitly stated otherwise, components and functions are optional and may be combined or subdivided, and operations may vary in sequence or be combined or subdivided. The following description provides numerous specific details to provide a thorough understanding of examples. However, it will be evident to one skilled in the art that the present subject matter may be practiced without these specific details.

A Multimodal Search System (MSS) is designed to enable accurate search and retrieval across different modalities of data, including images, videos, and text. The MSS leverages multimodal and domain-specific models to extract and represent features and information from multimodal data, enabling seamless querying using text-based search queries. The MSS integrates multiple pipelines, including feature vector-based and tag-based approaches, to ensure robust and scalable search capabilities.

The MSS addresses current multimodal-search challenges by leveraging a hybrid approach that combines multimodal embeddings, text embeddings, and semantic tagging to enable cross-modal searching. Additionally, for visual data, both tagging and embedding techniques are integrated within a single modality, ensuring a comprehensive and accurate representation. By assembling multiple retrieval strategies, the solution harnesses the strengths of each, resulting in a balanced and effective search system.

MSS enables cross-modal search functionality, allowing users to submit queries in one modality and retrieve results in another. This approach improves the efficiency and accuracy of data retrieval in environments where large-scale multimodal datasets are utilized.

The process begins with the ingestion of multimodal data, which is processed by a domain-specific semantic extraction module that extracts semantic information using techniques such as Vision-Language Models (VLMs), object recognition, Optical Character Recognition (OCR), and Text-to-Speech (T2S) conversion. The extracted information is then passed to an embedding generation stage, which includes a multimodal embedding model and a text embedding model. These models generate feature vectors that represent the semantic characteristics of the input data. A Large Language Model (LLM) further enriches these embeddings by extracting metadata tags related to brands, scenarios, emotions, or other domain-specific attributes. The generated feature vectors and tags are stored in a vector database. This database facilitates efficient retrieval operations by enabling elastic search mechanisms.

When a user submits a query, a query processing module generates embeddings and tags corresponding to the query. These are matched against the stored embeddings and tags using a vector matching and tag matching module. The results are refined and reranked based on criteria such as tag alignment and semantic coherence. The final output is presented to the user as retrieved results, which may include data from any modality that matches the query.

The solution supports flexible and scalable multimodal search capabilities and addresses the limitations of existing systems by enabling accurate cross-modal retrieval and handling complex queries. One benefit of the solution is its ability to improve workflows by reducing the time and effort required to locate relevant content. This is particularly useful in scenarios such as media asset management and video creation, where users need to retrieve specific segments or assets from extensive datasets. The architecture is adaptable and can be used for several modalities, such as sketches or point clouds, to enhance its applicability further.

Some of the concepts used for the description of the solution are presented below.

Multimodal Search System (MSS)—A system designed to enable accurate search and retrieval across different modalities of data, including images, videos, audio, and text. MSS leverages multimodal and domain-specific models to extract and represent features and information from multimodal data, enabling seamless querying using text-based or other modality-based search queries.

Modality—A type or form of data, such as images, videos, audio, text, sketches, or point clouds, that can be processed, searched, and retrieved by the system.

Cross-modal search—A search mechanism that allows queries in one modality (e.g., text) to retrieve results in the same or another modality (e.g., video).

Multimodal embedding—A dense feature vector generated by a multimodal embedding model to represent the semantic characteristics of multimodal data, such as images, videos, and audio, in a shared embedding space.

Text embedding—A feature vector generated by a text embedding model to represent textual data, such as descriptions, transcripts, or queries, in a latent space optimized for textual semantics.

Embedding space—A mathematical representation where feature vectors are mapped to facilitate similarity computations and efficient retrieval operations.

Large Language Model (LLM)—A machine learning model trained on extensive datasets to understand and generate human-like text. In the MSS, in some examples, the LLM is used for extracting structured tags and enriching embeddings with metadata.

Tags—Structured metadata generated by the LLM to represent high-level concepts, categories, or keywords associated with data. Tags may include attributes such as brand references, scenarios, emotions, or domain-specific information.

Domain-specific semantic extraction module—A module responsible for extracting semantic features from multimodal data using techniques such as Vision-Language Models (VLMs), object recognition, Optical Character Recognition (OCR), and Text-to-Speech (T2S) conversion.

Vision-Language Model (VLM)—A model that processes visual data, such as images and videos, to generate textual descriptions or captions, bridging the gap between visual content and textual semantics.

Vector database—A database optimized for storing feature vectors and tags, facilitating high-speed indexing and retrieval operations using elastic search mechanisms.

Elastic search mechanism—A search methodology that matches query embeddings and tags with stored embeddings and tags based on similarity metrics, such as cosine similarity or Euclidean distance.

Query processing module—A module that processes user queries to generate corresponding embeddings and tags for matching against stored data.

Vector matching—A process that compares query embeddings with stored embeddings using similarity metrics to identify relevant results.

Tag matching—A process that aligns query tags with stored tags to enhance the relevance of search results.

Refinement module—A module that prioritizes and reranks search results based on criteria such as tag alignment, semantic coherence, or domain-specific considerations.

Multimodal feature vector—A representation of multimodal data in the form of dense vectors that capture semantic relationships across various media.

Text feature vector—A representation of textual data in the form of dense vectors optimized for textual semantics.

Semantic filtering—A process that uses tags and metadata to refine search results and improve relevance.

Point cloud—A modality representing 3D data points in space, often used in applications such as 3D modeling or spatial analysis.

Sketch—A modality representing hand-drawn or computer-generated illustrations, which can be processed and indexed by the system.

Similarity metrics—Mathematical measures, such as cosine similarity or Euclidean distance, are used to compute the proximity between feature vectors during search operations.

Metadata—Auxiliary information extracted from data, such as descriptions, tags, or attributes, that provides additional context for indexing and retrieval.

Multimodal query—A user query submitted in any modality, such as text, image, audio, or video, to retrieve relevant results across diverse modalities.

Modality—agnostic learning framework-A machine learning approach that generalizes across multiple modalities, enabling robust and scalable performance without overfitting to a specific modality.

FIG. 1 illustrates the process of creating a unified transformer network (UTF) for learning representations from multiple modalities using multimodality pretraining and multiple tasks, according to some examples. The created UTF is used to make predictions or provide estimates for a plurality of tasks associated with a plurality of modalities.

In some examples, the knowledge of multiple modalities 102 is shared to embed the modalities 102 in a common embedding space 106 and to create task heads 108 for a variety of tasks.

To address diverse tasks, the network includes task-specific heads for unimodal objectives, as well as joint task heads for cross-modal tasks. Each task head is equipped with a loss function tailored to the respective task type. For instance, classification tasks employ cross-entropy loss, segmentation tasks rely on pixel-wise losses, and video text retrieval tasks utilize contrastive losses.

A task refers to a specific problem or objective that the AI model is designed to address. Some examples of tasks include classification (e.g., assigning a label to each input from a set of predefined categories, such as identifying spam emails and classifying images of animals), regression (e.g., predicting a continuous value based on input data, such as forecasting stock prices), clustering (e.g., grouping a set of inputs into clusters, where inputs in the same cluster are more similar to each other than to those in other clusters, such as customer segmentation or organizing a collection of news articles by topic), dimensionality reduction, anomaly detection (e.g., identifying unusual or rare items, events, or observations, such as fraud detection), reinforcement learning (e.g., learning an optimal policy or behavior through trial and error interactions with an environment, such as training a robot to navigate a maze), provide a recommendation (e.g., suggesting items to users based on their preferences and behaviors, such as suggesting products on an e-commerce platform), Natural Language Processing (NLP) (such as determining the sentiment (positive, negative, neutral) of a text), computer vision tasks (e.g., analysis of visual data, such as object detection to identify and localize objects within an image, or image segmentation to divide an image into segments or regions based on characteristics).

The modalities 102 may include any combination of images, depth maps, 3D point clouds, videos, audio, text, etc. Although some examples are presented with reference to the subset of their modalities 102, the principles presented herein may be applied to combinations of the modalities 102.

The UTF 104 is trained on multiple modalities 102 sequentially, allowing the embeddings (e.g., vectors) to generalize across modalities. Further, the result of the training is a trained UTF that includes task heads for performing multiple tasks.

Further, tasks are learned together with the unified UTF 104, which leads to regularization effects as a large number of shared parameters are trained to perform varied tasks and, hence, are more likely to extract meaningful representations from data without overfitting to one task or modality.

Learning tasks together also aids in utilizing available labeled data from different domains, hence potentially eliminating the cost and effort of labeling large amounts of data in a specific modality for a specific task. With the ability to share knowledge from multiple modalities 102 from different domains (e.g., visual, acoustic, textual), the modality-agnostic learning frameworks have been shown to provide better robustness than traditional unimodal networks.

The embeddings represent data points from the various modalities 102 that are converted into vectors. One characteristic of these embedding vectors is that if two input data points from the same modality (e.g., two images of cats) are used, the resulting embeddings should be close to each other, indicating a smaller distance between them than in the case where the two data points are not related to each other. Further, if two items from different modalities (e.g., a video and a text transcript of the video) are related, the embeddings will be close to each other; that is, the distance between the embeddings will be smaller than the distance between the embeddings if the two items were not related.

Some existing methods use a single source of information to train their models. For example, to teach a machine to recognize images, a large dataset of images is used to train the model. However, this approach only allows the model to learn from a single modality.

To work with multiple modalities simultaneously, the training strategy allows leveraging knowledge from multiple modalities while the UTF 104 is trained.

One advantage of utilizing a multimodal approach is the ability to leverage information from different modalities to enhance predictive performance. By jointly learning tasks across multiple modalities, such as depth images and RGB data for object detection, a synergistic effect can be achieved, leading to improved overall performance through cross-modality interactions.

Furthermore, the benefits of multimodal learning extend to optimizing performance in individual modalities. In cases where acquiring additional data for a specific modality may be challenging, leveraging existing data from other modalities is beneficial. By combining data from multiple modalities in training, it is possible to enhance performance without the need for extensive data collection efforts.

Figure 2:
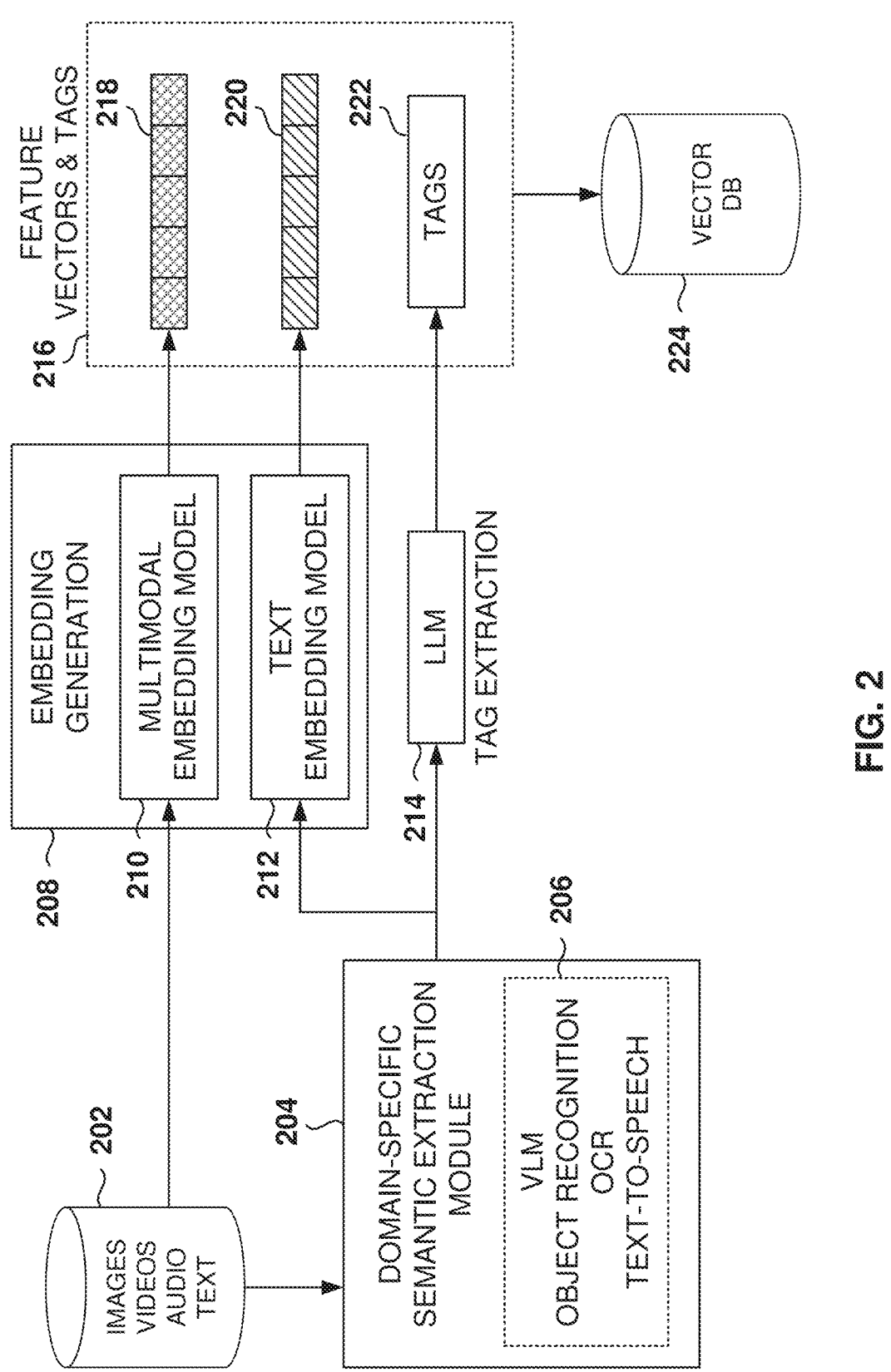
FIG. 2 is a diagram illustrating the generation of multimodal embeddings and related tags, according to some examples.

FIG. 2 is a diagram illustrating the generation of multimodal embeddings and related tags, according to some examples. The Multimodal Search System (MSS) is engineered to retrieve relevant assets, such as text, images, and videos, in response to a multimodal query that may be presented as text, an image, or a video.

The MSS is designed to facilitate multimodal search functionality. Multimodal search refers to the ability to search across various data types, including videos, images, and text, which are stored and accessible to users. Queries can be submitted in any modality, such as text, image, audio, or video, and the system supports cross-modal search mechanisms. The input data and the target data being searched can both belong to any modality, ensuring flexibility in search operations It is noted that the illustrated examples involve the use of two embeddings, but the same principles may be used for additional or different modality embeddings. Multiple embedding types can be utilized to represent diverse modalities. The illustrated examples should therefore not be interpreted to be exclusive or limiting, but rather illustrative.

The MSS processes multimodal data to construct structured representations in three distinct formats. Multimodal feature vectors are derived from a multimodal embedding model designed to capture semantic relationships across various media, including images, videos, and text. Further, text feature vectors are created by transforming extracted textual descriptions into latent representations through a text embedding model. Additionally, a tag-based representation is produced using large language models (LLMs) that generate structured tags, facilitating filtering and additional semantic matching.

The MSS is designed to establish a unified framework that facilitates searching across images, videos, and text documents. MSS aims to utilize both multimodal and text-based embeddings to achieve accurate feature representations. By supporting search queries in various formats (e.g., text, image, or video), the MSS ensures flexibility in querying.

Further, MSS is built to maintain scalability and efficiency, providing effective handling of large-scale multimodal datasets. The MSS incorporates multiple retrieval strategies to enhance the overall search performance. Additionally, MSS allows for the direct comparison of multimodal data within a shared embedding space through the integration of multimodal embeddings.

The data processing pipeline for the multimodal search and retrieval system is designed to handle various forms of input data, including images, videos, and textual content. The pipeline includes a feature vector extraction and a semantic tag extraction. The MSS processes multimodal assets (images, videos, and text) using a multimodal model to generate dense feature vectors that represent the assets in a shared embedding space.

The MSS processes input data 202, including images, videos, audio, and text, to create structured representations that facilitate multimodal search functionality. The input data 202 is processed by a domain-specific semantic extraction module 204.

The domain-specific semantic extraction module 204 is responsible for extracting domain-specific semantic features from multimodal data, transforming raw data into structured, semantically rich representations. The domain-specific semantic extraction module 204 employs various techniques 206, such as Vision-Language Models (VLM), object and scene recognition models, Optical Character Recognition (OCR), and Text-to-Speech conversion (for generating textual transcripts as documents of audios and for textual data, such as articles or documents), to extract meaningful semantic information from the input data.

The VLM processes images and videos to generate textual descriptions or captions, effectively bridging the gap between visual content and textual semantics, enabling the system to understand and generate human-readable descriptions from visual assets.

The object and scene recognition models perform fine-grained analysis of images and videos to identify and classify key objects, scenes, and visual attributes. The object and scene recognition models contribute to the generation of a comprehensive multimodal feature vector that captures the visual context of the asset.

OCR is applied to images and videos to extract any textual information embedded within the visual content. OCR is used for extracting information from screenshots, posters, or any multimedia content that contains visible text.

These techniques enable the system to identify and classify objects, scenes, textual content, and audio features, bridging the gap between different modalities and creating a unified semantic understanding of the data.

The extracted semantic information is then passed to the embedding generation 208, which comprises two models: a multimodal-embedding model 210 and a text-embedding model 212. The multimodal-embedding model 210 generates dense feature vectors that represent the semantic characteristics of multimodal data, such as images, videos, and audio, by learning a unified representation of multimodal assets. These feature vectors capture cross-modal relationships and enable the system to represent diverse data types in a shared embedding space. The text-embedding model 212 processes textual data, including descriptions, transcripts, and queries, to generate text-specific feature vectors. These vectors are mapped into a separate latent space optimized for textual semantics.

An LLM 214 performs tag extraction based on the semantic information derived from the input data. The LLM 214 generates structured tags 222 that represent high-level concepts, categories, or keywords associated with the data. The textual descriptions generated by the VLM and OCR models are processed by the LLM 214 to generate structured, predefined tags. These tags can represent various high-level concepts, categories, or keywords that provide additional semantic categorization. For example, the tags may indicate a specific brand, a particular scenario, company-specific content, an emotion, etc.

The tags can be customized or predefined based on the system's requirements, offering flexible categorization beyond the raw textual content. These tags 222 provide an additional layer of semantic categorization, enabling filtering and enhancing the relevance of search results. The tags assist in semantic filtering to improve the relevance of search results.

The outputs of the embedding generation 208 and the LLM 214 are collectively organized into feature vectors and tags 216, which include multimodal feature vectors 218, textual feature vectors 220, and tags 222. These representations are stored in a vector database 224, which is optimized for high-speed indexing and retrieval operations. The vector database 224 facilitates efficient matching between query embeddings and stored embeddings, leveraging Elastic Search mechanisms to identify relevant results based on vector proximity and tag alignment.

This architecture enables the system to process multimodal data comprehensively, ensuring accurate and scalable search capabilities across diverse modalities. By integrating multimodal embeddings, text embeddings, and semantic tags, the MSS achieves robust cross-modal retrieval and supports complex queries involving brand-specific content, emotional context, or domain-specific metadata.

In one use example, customers upload their videos and assets, e.g., images and videos related to their products or services, onto the platform. Customers often upload large volumes of data, ranging from 100 to 200 GB of videos and images, which serve as the input for processing. The customer may request to create a video summarizing their company's achievements over the past year to motivate employees, with the desired output being a thirty-second video.

After the videos are uploaded, the MSS semantically chunks the data by extracting meaningful and coherent content. For videos, smaller clips containing relevant information are generated and indexed separately. Descriptions of the video content are also extracted, including details about the objects present, the information conveyed, and any references to products or brands. For example, a request may involve creating a video featuring a person drinking from a soda bottle, which requires identifying and indexing such specific content for that brand.

Figure 3:
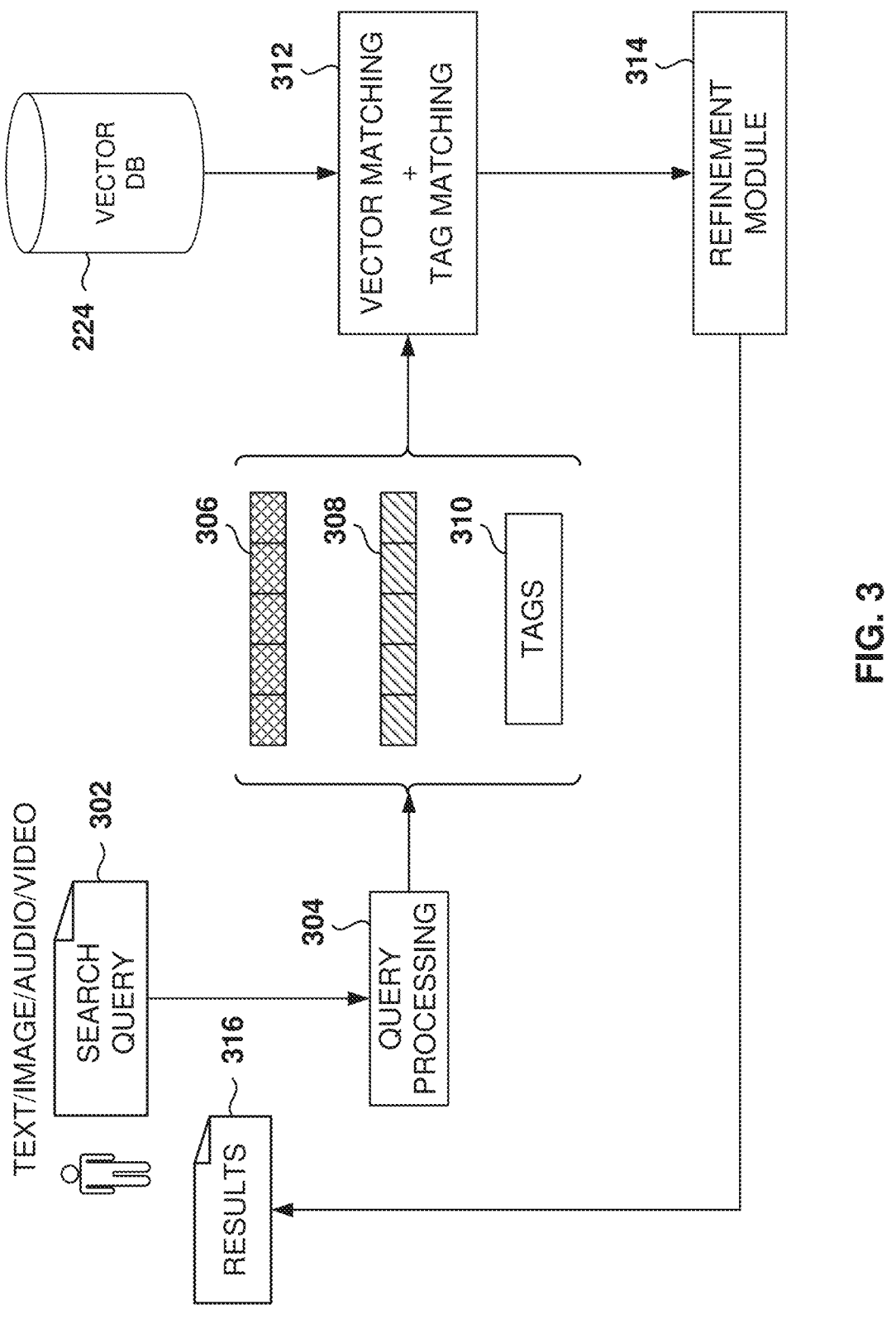
FIG. 3 illustrates the multimodal search based on the multimodal embeddings and related tags, according to some examples.

FIG. 3 illustrates the multimodal search based on the multimodal embeddings and related tags, according to some examples. To handle the wide range of queries, the MSS employs a search methodology that involves converting data points into embeddings and using these embeddings for retrieval. Additionally, the MSS extracts detailed information from the content, such as the events occurring in the video, the objects present, the emotions conveyed, and any brand-specific references. Since the brand assets are already available, the MSS extracts, fetches, and indexes metadata and auxiliary information, ensuring comprehensive indexing of all relevant data.

The process begins with a search query 302, which can be submitted in any modality, such as text, image, audio, or video. The search query 302 is passed to a query processing module 304, which extracts structured representations from the search query 302.

The MSS extracts three distinct types of representations, similar to those used for data assets. Initially, the multimodal feature vector 306 is created from the search query 302. This process is performed by the multimodal embedding model, which encodes the semantics of the query within the same feature space as the multimodal data.

The text feature vector 308 is extracted from the textual component of the search query 302. This text feature vector 308 is generated by the text embedding model, which maps the information into a text-specific latent space. Further, the LLM generates the tags 310, which include breaking down the query into predefined tags that are consistent with those utilized within the vector database 224. The tags 310 are extracted using the LLM to identify high-level semantic attributes, such as brand references, scenarios, or emotions.

The generated feature vectors and tags are matched against pre-indexed data stored in the vector database 224. The vector database 224 contains multimodal feature vectors, textual feature vectors, and associated tags for various data assets, enabling efficient retrieval operations.

Search operations are performed separately on the multimodal feature vector 306 and the text feature vector 308. The matching process is performed by a vector matching and tag matching module 312, which compares the query embeddings and tags with the stored embeddings and tags. In some examples, the vector matching operations utilize similarity metrics, such as cosine similarity or Euclidean distance, to identify relevant results based on feature vector proximity. Tag matching ensures alignment between the query tags and the tags associated with the stored data.

These three representations are used in parallel to match against the multimodal data, ensuring that the query is comprehensively understood from both a vector and a semantic perspective.

In some examples, the search and retrieval process utilizes an elastic search to effectively match the search query 302 with the stored assets in the vector database 224, employing both feature vectors and the tags 310. During vector matching, the search query 302 feature vectors are compared to pre-indexed vectors through vector similarity operations. Techniques such as cosine similarity, Euclidean distance, or other distance metrics are used to assess the matches. Additionally, tag matching aligns the tags 310 for the search query 302 with the corresponding tags of the assets. This alignment allows the system to harness the similarity between the query tags and asset tags, enhancing the accuracy of the search and retrieval process.

The results from the vector matching and tag matching module 312 are further refined by a refinement module 314. The results based on the multimodal feature vector 306 are ranked, and the results based on the text feature vector 308 are also ranked. A combined score is then calculated from the individual scores, and the results are reranked accordingly. The refinement module 314 combines the scores from vector-based and tag-based matching to prioritize and re-rank the results, resulting in a combined ranking of the search results.

In some examples, the refinement module 314 also incorporates tag-based filtering techniques to refine outcomes further, guaranteeing that the most relevant assets are incorporated. In some examples, a cascading retrieval strategy is employed, wherein an initial matching phase-leveraging the most semantically rich representation—is succeeded by further refinements utilizing other modalities. The ultimate results are then ranked based on their aggregated matching scores, with the top-k results being selected and presented to the user.

The output from the refinement module 314 is presented as results 316, which may include data from any modality that matches the query intent. The system supports flexible and scalable multimodal search capabilities, enabling cross-modal retrieval and efficient handling of large-scale datasets.

Figure 4:
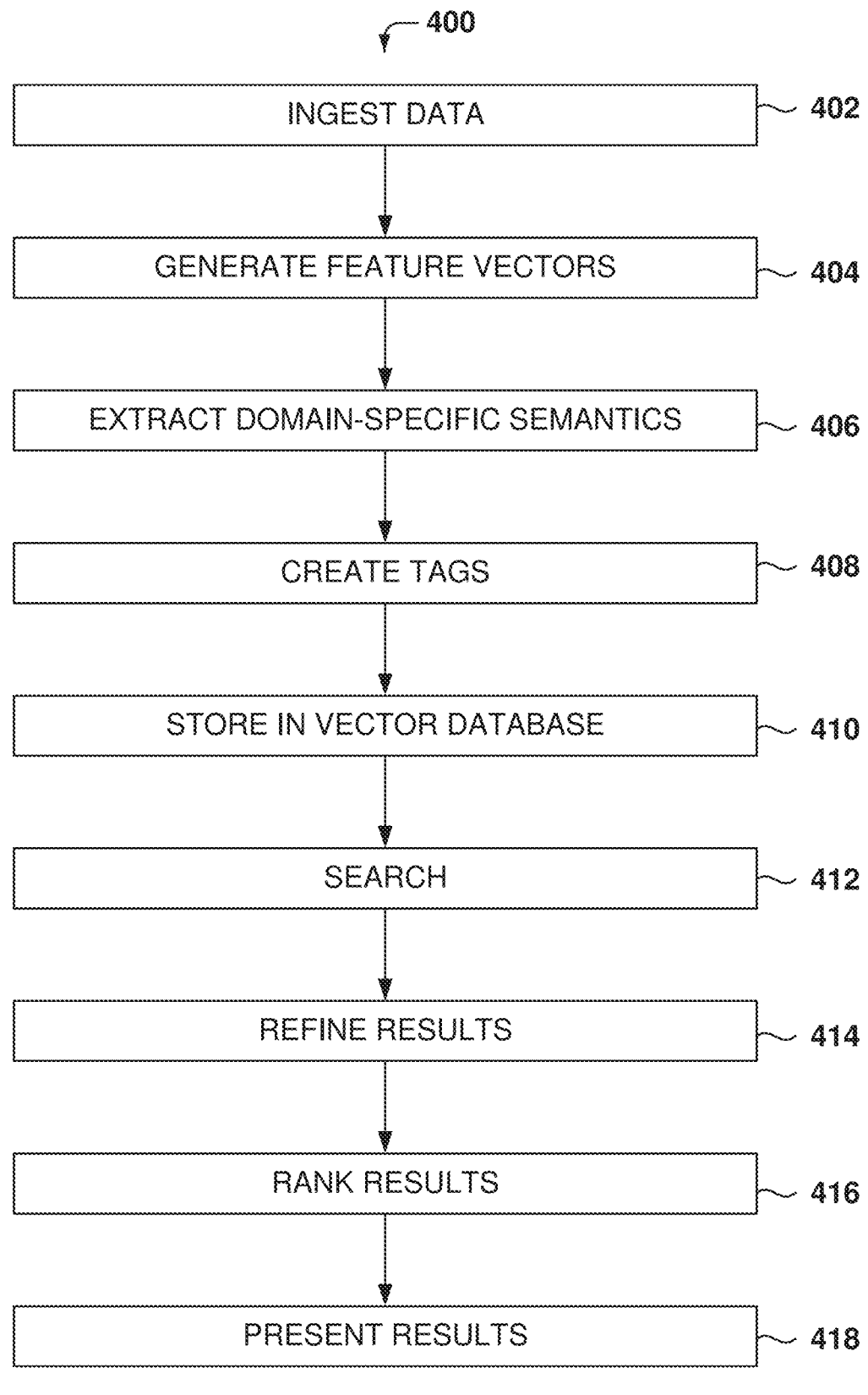
FIG. 4 is a flowchart of a method for multimodal searching, according to some examples.

FIG. 4 is a flowchart of a method 400 for multimodal searching, according to some examples. While the various operations in this flowchart are presented and described sequentially, one of ordinary skill will appreciate that some or all of the operations may be executed in a different order, be combined or omitted, or be executed in parallel.

Operation 402 is for ingesting multimodal data. The data may include images, videos, audio, text (e.g., articles, documents, or other textual content), sketches, etc., which are collected from various sources such as user uploads, external databases, or streaming platforms. In some examples, preprocessing is performed to standardize the data formats and ensure compatibility with downstream modules.

From operation 402, the method 400 flows to operation 404 for generating feature vectors. At operation 404, the system processes the ingested data to create structured representations in the form of feature vectors. In some examples, a multimodal embedding model generates dense feature vectors that represent the semantic characteristics of multimodal data, such as images, videos, and audio. Additionally, a text embedding model processes textual data to generate text-specific feature vectors.

From operation 404, the method 400 flows to operation 406 for extracting domain-specific semantics. At operation 406, the system employs a domain-specific semantic extraction module to analyze the multimodal data and extract meaningful semantic information. In some examples, techniques such as VLMs, object recognition, OCR, and text-to-speech conversion are applied to identify objects, scenes, textual content, and audio features. These techniques enable the system to bridge the gap between different modalities and create a unified semantic understanding of the data.

From operation 406, the method 400 flows to operation 408 for creating tags. MSS utilizes the LLM to generate structured tags based on the extracted semantic information. In some examples, the tags represent high-level concepts, categories, or keywords associated with the data, such as brand references, scenarios, emotions, or other domain-specific attributes. These tags provide an additional layer of semantic categorization, enabling filtering and enhancing the relevance of search results.

From operation 408, the method 400 flows to operation 410 for storing the generated feature vectors and tags in the vector database. MSS ingests the multimodal feature vectors, textual feature vectors, and associated tags into a vector database optimized for high-speed indexing and retrieval operations.

From operation 410, the method 400 flows to operation 412 for performing a search based on a received user query, which may be in the form of text, image, audio, video, or a sketch, to generate corresponding query embeddings and tags. These query embeddings and tags are matched against the stored embeddings and tags in the vector database using vector matching and tag matching techniques.

From operation 412, the method 400 flows to operation 414 to refine the results. The refinement module prioritizes and re-ranks the matched results based on additional criteria, such as tag matching. In some examples, the refinement process incorporates tag relevance, semantic coherence, or other domain-specific considerations to ensure that the most relevant results are selected.

From operation 414, the method 400 flows to operation 416 for ranking the results. The refinement module combines the scores from vector-based and tag-based matching to generate a final ranking of the search results. In some examples, the ranking process may involve cascading retrieval strategies, where the first matching stage is followed by additional refinements using secondary representations.

From operation 416, the method 400 flows to operation 418 to present the set of ranked results to the user. The results may include data from any modality that matches the query intent, such as video clips, images, audio files, and text snippets.

The architecture is designed to be scalable and adaptable. Additional modalities, such as sketches or point clouds, can be integrated by extending the domain-specific semantic extraction module and embedding generation stage. The system can also be configured to handle larger datasets by scaling the vector database and optimizing query processing pipelines.

Further, encryption and access control mechanisms are implemented to protect sensitive user data. Additionally, techniques such as caching and parallel processing can be employed to reduce retrieval times.

Figure 5:
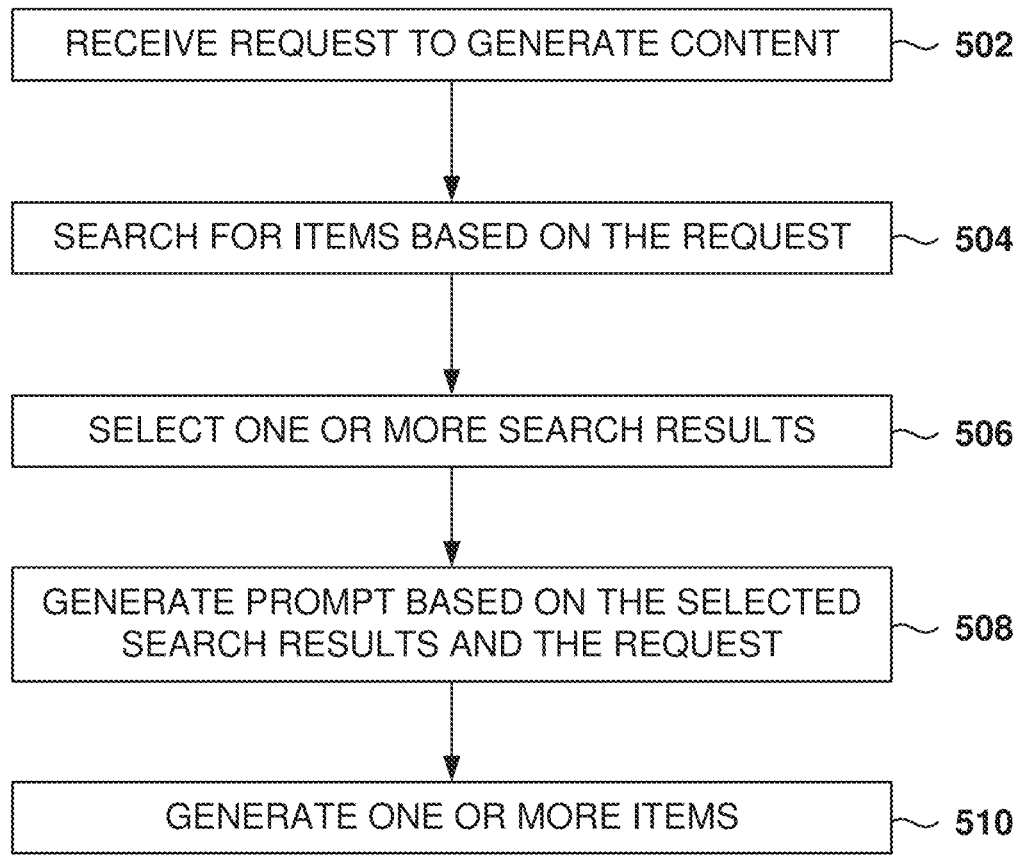
FIG. 5 is a flowchart of a method for generating content based on a multimodal search of relevant items, according to some examples.

FIG. 5 is a flowchart of a method 500 for generating content based on a multimodal search of relevant items, according to some examples. While the various operations in this flowchart are presented and described sequentially, one of ordinary skill will appreciate that some or all of the operations may be executed in a different order, be combined or omitted, or be executed in parallel. The method comprises a series of operations denoted by reference numbers, beginning with operation 502 and concluding with operation 510.

One use case involves customers searching for specific segments within their uploaded videos to create their own content. For instance, a query may request a five-second clip featuring a man by the pool drinking from a Sprite can. The system is designed to retrieve such specific content from the large dataset of 100 to 200 GB of videos.

MSS retrieves the requested content and presents the results to the user, allowing the user to incorporate the retrieved segment into their video clip or perform additional modifications. Queries can range from highly specific, such as those involving brand-related content, to more general requests, such as retrieving segments that convey excitement or motivational themes.

At operation 502, a request to generate content is received. The request may include input data specifying the desired content type, such as text, images, videos, or audio. In some examples, the request may also include additional parameters, such as the intended audience, thematic elements, or specific attributes to be incorporated into the generated content. The input data may be provided by a user or derived from external systems, and this input data serves as the basis for initiating the content generation process.

From operation 502, the method 500 flows to operation 504 to search for items based on the request. MSS performs a multimodal search to identify relevant items that align with the parameters specified in the request. The search may involve querying a vector database 224 containing multimodal feature vectors, textual feature vectors, and associated tags. In some examples, the search process utilizes vector matching techniques, such as cosine similarity or Euclidean distance, to compare the request parameters with stored embeddings. Tag matching may also be employed to ensure semantic alignment between the request and the indexed data. The search results may include items from various modalities, such as video clips, images, text snippets, sketches, or audio files.

From operation 504, the method 500 flows to operation 506 to select one or more search results. MSS evaluates the retrieved items and selects those items that most closely align with the request parameters. The selection process may involve ranking the search results based on criteria such as vector proximity, tag relevance, or semantic coherence. In some examples, the refinement module prioritizes the more relevant items and filters out less relevant results.

From operation 506, the method 500 flows to operation 508 to generate a prompt based on the selected search results and the request. At operation 508, the system constructs a structured prompt that integrates the information derived from the selected search results with the parameters specified in the request. The prompt may include detailed instructions, thematic elements, and contextual information to guide the content generation process. In some examples, the system utilizes a prompt generator 708 to create the prompt, leveraging predefined templates, user-provided data, or heuristics. The prompt may be tailored to the specific requirements of the content generation model, ensuring compatibility and alignment with the desired output.

From operation 508, the method 500 flows to operation 510 to generate one or more items. At operation 510, the system utilizes a generative artificial intelligence (GAI) model to produce new content based on the constructed prompt. The GAI model may be trained on large datasets and configured to generate items in various modalities, such as text, images, videos, or audio. In some examples, the generated items may undergo postprocessing to enhance quality, ensure consistency, or align with the intended purpose. The results are presented on a user device or integrated into downstream systems for further use.

This process enables the generation of content by leveraging multimodal search and retrieval operations, ensuring that the generated items align with the request parameters and incorporate relevant information from diverse data sources.

Figure 6:
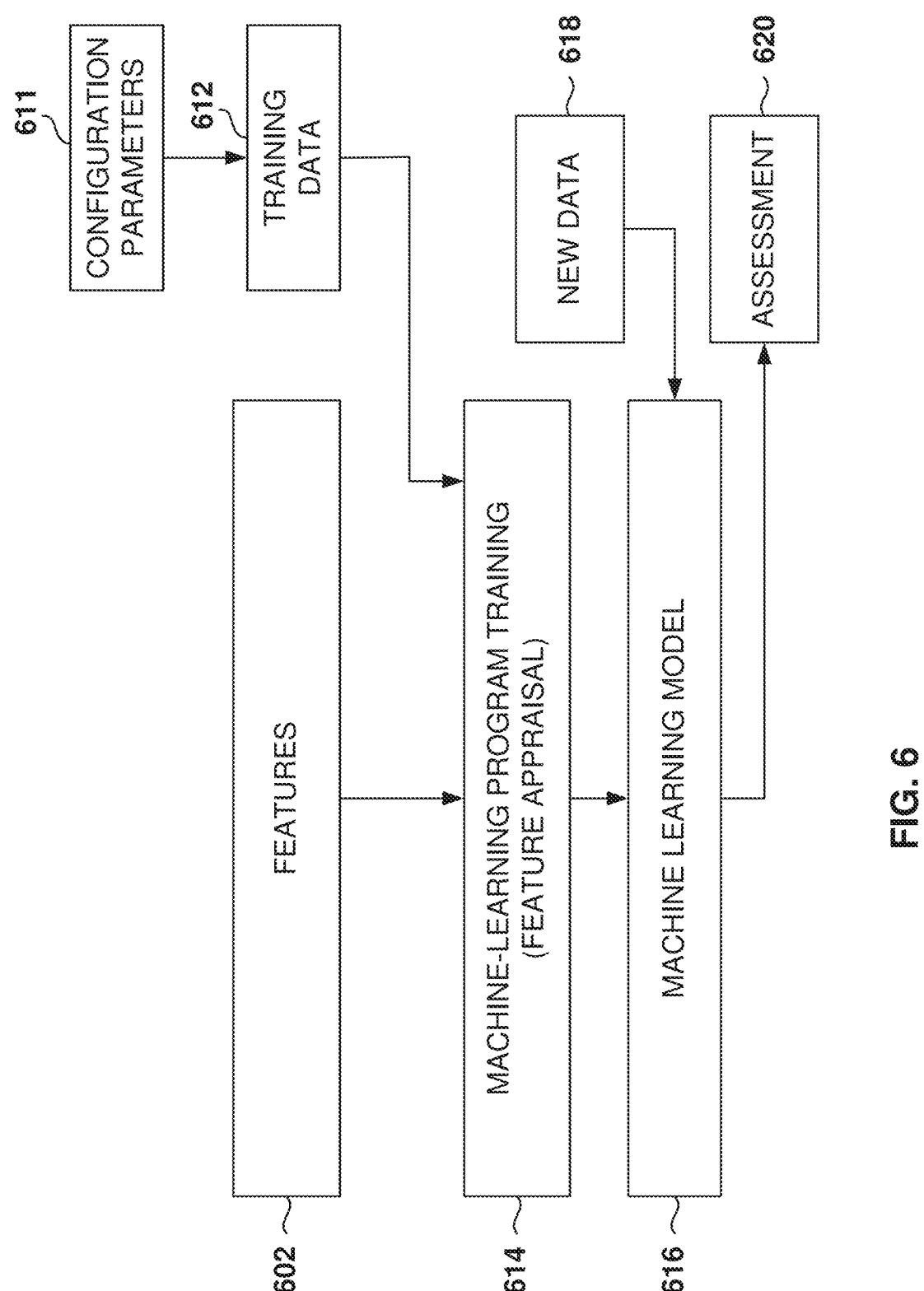
FIG. 6 illustrates the training and use of a machine-learning model 616, according to some examples.

FIG. 6 illustrates the training and use of a machine-learning model 616, according to some examples. In some examples, machine learning (ML) models 616 are utilized to perform operations associated with searches, such as multimodal searching and feature vector embedding.

Machine Learning (ML) is an application that provides computer systems the ability to perform tasks without explicitly being programmed by making inferences based on patterns found in the analysis of data. Machine learning explores the study and construction of algorithms, also referred to herein as tools, that may learn from existing data and make predictions about new data. Such machine-learning algorithms operate by building an ML model 616 from training data 612 in order to make data-driven predictions or decisions expressed as outputs or assessments 620. Although examples are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. Unsupervised ML is the training of an ML algorithm, using information that is neither classified nor labeled, and allowing the algorithm to act on that information without guidance. Typical tasks for supervised ML are classification problems and regression problems. Some typical tasks for unsupervised ML include clustering, representation learning, and density estimation. Some examples of commonly used unsupervised ML algorithms are K-means clustering, principal component analysis, and autoencoders. In some examples, the ML model 616 provides an embedding in a multimodal space.

During training 614, the ML program, also referred to as ML algorithm or ML tool, analyzes the training data 612 based on identified features 602 and configuration parameters 611 defined for the training. The result of the training 614 is the ML model 616, which is capable of taking inputs to produce assessments.

Some ML algorithms include configuration parameters 611, and the more complex the ML algorithm, the more parameters that are available to the user. The configuration parameters 611 define variables for an ML algorithm in the search for the best ML model. The training parameters include model parameters and hyperparameters. Model parameters are learned from the training data, whereas hyperparameters are not learned from the training data but are instead provided to the ML algorithm.

When the ML model 616 is used to perform an assessment, new data 618 is provided as input to the ML model 616, and the ML model 616 generates the assessment 620 as output. In some examples, results obtained by the model 616 during operation (e.g., assessment 620 produced by the model in response to inputs) are used to improve the training data 612, which is then used to generate a newer version of the model. Thus, a feedback loop is formed to use the results obtained by the model to improve the model.

Figure 7:
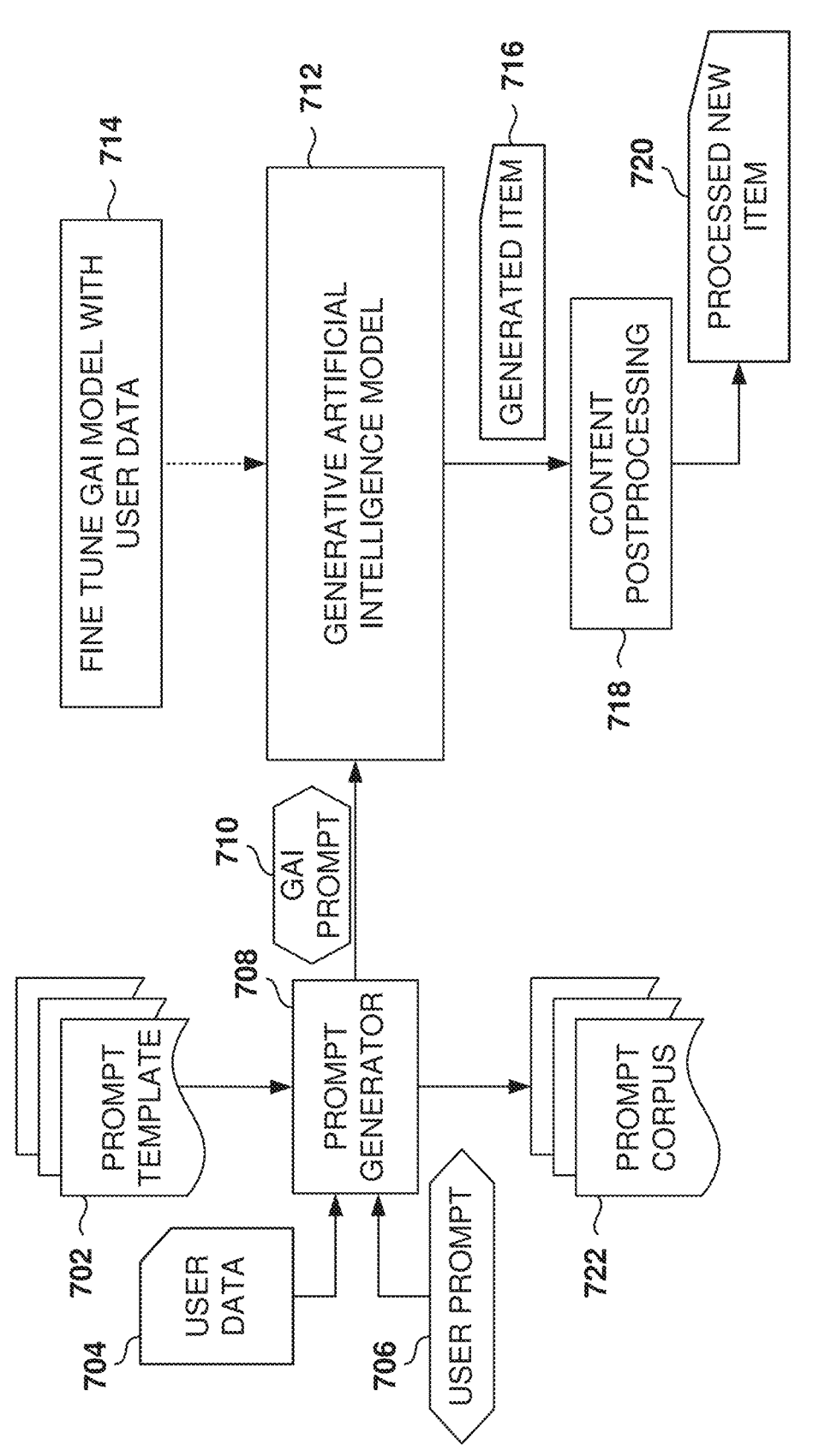
FIG. 7 illustrates the use of a Generative Artificial Intelligence (GAI) model to generate new content, according to some examples.

FIG. 7 illustrates the use of a Generative Artificial Intelligence (GAI) model 712 to generate new content, according to some examples. GAI is a type of AI that can generate new content, such as images, text, video, or audio. The GAI model 712 is trained on large datasets of data and uses this data to learn the patterns and relationships between different elements of the data. There are several types of GAI models, such as Generative Adversarial Networks (GANs), Variational Autoencoders (VAEs), and Autoregressive models.

The GAI models generate items of different types, such as GAI models for creating text (e.g., GPT-4, Pathways Language Model 2 (PaLM 2), LaMDA), images (e.g., DALL-E 2, Stable Diffusion), videos (Runway Gen-2, Stable Diffusion Video), audio (e.g., Google MusicLM, Stable Audio), etc.

Often, the companies that create the GAI models make the GAI models available to users who can apply them to generate the desired content based on a GAI prompt 710 provided to the GAI model 712. Users can utilize the GAI model 712 as provided by the vendor or can optionally fine-tune 714 the GAI model 712 with their user data to adjust the parameters of the GAI model 712 in order to improve performance on a specific task or domain.

In some examples, fine-tuning the GAI model 712 includes the following operations:

1. Collect user data: Gather a collection of user data that is relevant to the target task or domain. This data could include text, images, audio, or other types of data;
2. Label the data: if the task requires supervised learning, the user data is labeled with the correct outputs;
3. Select a fine-tuning method. Some of the methods for fine-tuning GAI models include Full fine-tuning, Few-shot fine-tuning, and Prompt-based fine-tuning;

4. Train the GAI model 712: Perform incremental training of the tune 714 using the selected fine-tuning method and
5. Optionally, evaluate the performance of the fine-tuned model on a held-out dataset.

The GAI model 712 can be used to generate new content based on the GAI prompt 710 used as input, and the GAI model 712 creates a newly generated item 716 as output.

The GAI prompt 710 is a piece of text or code that is used to instruct the GAI model 712 to generate a desired output (e.g., generated item 716). The GAI prompt 710 provides context, instructions, and expectations for the output. The newly generated item 716 may be multi-modal, such as a piece of text, an image, a video, an audio, a piece of programming code, etc., or a combination thereof.

Prompt engineering is the process of designing and crafting prompts to effectively instruct and guide a GAI model toward generating desired outputs. It involves selecting and structuring the text that forms the GAI prompt 710 input to the GAI model 712, ensuring that the GAI prompt 710 accurately conveys the task, context, and desired style of the output.

A prompt generator 708 is a computer program that generates the GAI prompt 710. There are several ways to generate the GAI prompt 710. In one example, the prompt generator 708 may use a user prompt 706 entered by the user in plain language as the GAI prompt 710. In other examples, the prompt generator 708 creates the GAI prompt 710 without having a user prompt 706, such as by using a static pre-generated prompt based on the desired output.

In other examples, the prompt generator 708 uses a prompt template 702 to generate the GAI prompt 710. The prompt template 702 defines the structure of the GAI prompt 710 and may include fields that may be filled in based on available information to generate the GAI prompt, such as user data 704 or user prompt 706. The prompt template may also include rules for creating the GAI prompt (e.g., include specific text when the recipient resides in California, but do not include the text if the recipient does not reside in California). In other examples, the prompt generator 708 uses heuristics codified into a computer program to generate the GAI prompt 710.

An example template for generating a prompt to create an image for a marketing campaign is as follows:

You are an AI Assistant that will help create prompts that can be used to generate images with DALL-E and stable diffusion.

The user can provide information as input for generation:
1. Product or service information (e.g., selling t-shirts)
2. Goal—Example—I want to run a promotion for Halloween
3. Audience Information—Location, Gender, Demographics, Age group
4. Channel—Email, Instagram, TikTok, etc.

Use the above information in the following way to generate the prompt.

Product Information:
Clearly highlight the main product.
Example: "A t-shirt"

Goal:
Incorporate the objective or theme of the promotion.
Example: "with a unique Halloween-themed design"

Audience Information:
Add elements that resonate with the target audience's location, gender, demographics, and age group. Ensure the depiction is inclusive and diverse.

Example (based on hypothetical audience info): "being worn by a young male from Italy in his 20s"

Channel:

Tailor the style and format based on the channel you're targeting. For instance:

Email: A more detailed and descriptive scene as it's viewed on larger screens.

Instagram: Focus on aesthetics and vibrant visuals.

TikTok: Dynamic and engaging visuals, perhaps hinting at movement or a narrative.

Example (for Instagram): "The setting is a moonlit night in an Italian piazza, where the young man joins friends for a Halloween celebration. The atmosphere is festive with jack-o'-lanterns, cobblestone streets, and ancient buildings in the background. The image is vibrant and aesthetically pleasing, perfect for an Instagram post."

Final Prompt:

"A t-shirt with a unique Halloween-themed design being worn by a young male from Italy in his 20s. The setting is a moonlit night in an Italian piazza, where the young man joins friends for a Halloween celebration. The atmosphere is festive with jack-o'-lanterns, cobblestone streets, and ancient buildings in the background. The image is vibrant and aesthetically pleasing, perfect for an Instagram post."

Remember, this is just one example. Depending on the specifics of the audience information and the chosen channel, the prompt can be tailored differently. The idea is to incorporate all the provided details into a cohesive and engaging narrative for the image.

Creating a good prompt structure for generating images with models like DALL. E or Stable Diffusion requires a balance of specificity and creativity. Here's a breakdown of the essential elements and how you can structure them:

1. Type of Image:  Start by specifying the format or medium of the image. For example:

Photo

Oil painting

Watercolor painting

Illustration

Cartoon

Drawing

Vector

Render

2. Main Subject:  Clearly identify the primary focus or subject of the image. Be as specific as you can. Instead of "bird," say "a crimson-feathered parrot."

3. Action or State:  Describe what the subject is doing or the state it's in. For instance, "soaring through a clear blue sky" or "perched on a wooden branch."

4. Setting or Background: Provide context by describing the environment or setting. This could be "a bustling city square," "a serene lakeside," or "a starry night."

5. Additional Details: Enhance the scene with additional elements or props. These can be objects, secondary characters, or even weather conditions. For example, "with children flying kites" or "as rain gently falls."

6. Mood or Atmosphere: If you have a particular mood or tone in mind, specify it. Words like "sunset," "dreamy," "nostalgic," or "futuristic" can guide the generation.

7. Diversity and Representation: Especially for images with people, ensure that you specify diverse gender, racial, and other representations to avoid unintentional biases.

8.  Perspective and Orientation:  Mention if you want a specific viewpoint like "bird's eye view" or "close-up." Also, if the image should be "wide" (landscape) or "tall" (portrait), include that.

Here's a structured example:

"Photo of a diverse group of young people sitting around a campfire in a dense forest at twilight, laughing and sharing stories, with sparks from the fire rising into the starry night."

Remember, while it's essential to be specific to guide the model, leaving a bit of room for creativity can lead to surprising and delightful results. Adjust the level of detail based on the desired outcome.

Targeting imagery based on audience demographics like location, gender, and age can enhance the effectiveness of the visual content. Here's how you can tailor image prompts to appeal to specific audience attributes:

1. ** Location:

Cultural References:  Incorporate elements, symbols, or landmarks that resonate with people from that specific region.

Landscapes & Settings:  Use typical settings from the location, such as cityscapes, countryside, beaches, or mountains.

Color Palette:  Some cultures have color preferences based on traditions, seasons, or festivals.

2.  Gender:

* Inclusivity: ** Ensure representation of all genders. Avoid stereotypes; instead, focus on universal themes or elements that resonate with the target gender.

Themes & Motifs:  Depending on research and insights, you might incorporate certain themes, patterns, or motifs that appeal to a specific gender.

3.  Age:

*Children (below 12 years):**

Style:  Cartoons, animations, or illustrations with bright colors.

Elements:  Friendly animals, magical creatures, superheroes, and playful settings.

** Teens (13-19 years): *

* Style: ** Trendy illustrations, digital art, or photographs.

Elements:  Pop culture references, technology, hobbies, and youth-centric activities.

Adults (20-60 years):

* Style: ** Realistic photos, classic paintings, or mature illustrations.

Elements:  Daily life, work, family, nature, hobbies, and contemporary themes.

Seniors (60+ years):

* Style: ** Vintage or nostalgic imagery, calming watercolors, or serene photos.

Elements:  Nature, landscapes, nostalgia, classical art, and leisure activities.

4. ** Interests & Hobbies:

If you have information on the target audience's interests, incorporate elements that resonate with those hobbies or passions.

5.  Emotional Appeal:

Think about the emotion you want to evoke. Children might respond to joy and wonder, teens to aspiration and adventure, adults to connection and nostalgia, and seniors to tranquility and reflection.

6. ** Narrative & Storytelling: *

Craft a narrative that resonates with the target group. Kids might enjoy a story of adventure, teens a coming-of-age tale, adults a journey of discovery, and seniors a trip down memory lane.

When constructing your prompt, always combine these tailored elements to create a cohesive and appealing image. For instance:

"Cartoon illustration of a magical forest with bright-colored trees, where friendly animals host a picnic for children, with a backdrop of a famous landmark from [Location]."

Remember, while these are general guidelines, individual preferences can vary widely. It's essential to understand your specific audience and adjust the attributes accordingly.

Incorporating channel-specific information into your image prompts is crucial because each platform has its own audience expectations, content style, and purpose. Here's how you can tailor your prompts based on popular social media channels:

1. ** Instagram: * *
   * Purpose: ** Primarily visual content; used for personal sharing, lifestyle branding, and visual storytelling.
    Prompt Attributes:  Focus on aesthetics, vibrant colors, and visually pleasing compositions.
    Example:  "Photo of a minimalist workspace with pastel-colored stationery, a succulent plant, and a morning coffee cup, suitable for a lifestyle influencer on Instagram."

2.  TikTok: 
   * Purpose: ** Short-form video platform known for fun, entertaining, and sometimes educational content.
   *Prompt Attributes: ** Emphasize dynamic, youthful, and trendy elements. Consider popular challenges, dances, or meme formats.
    Example:  "Illustration of a diverse group of young people dancing in trendy outfits to a popular song, with vibrant neon lights in the background, perfect for a TikTok dance challenge."

3. ** LinkedIn: *
   Purpose: ** Professional networking and industry news.
    Prompt Attributes:  Prioritize professional, clean, and formal visuals. Showcase industry-related themes, corporate environments, and professional individuals.
    Example:  "Photo of a diverse group of professionals in a modern office boardroom, discussing a project with charts and graphs projected on a screen, suitable for a LinkedIn post on teamwork."

4.  Twitter: 
   * Purpose: ** News, updates, personal opinions, and quick information sharing.
    Prompt Attributes:  Go for relevant, timely, and sometimes witty or satirical visuals. Infographics or concise visuals work well.
    Example:  "Illustration of a bird (representing Twitter) perched on a globe, tweeting out news headlines, ideal for a tweet about current global events."

5. ** Facebook: *
   * Purpose: ** Personal updates, news sharing, and community interactions.
    Prompt Attributes:  Focus on relatable, family-friendly, and community-centric visuals.

Example:  "Photo of a community event in a local park, with families enjoying a barbecue and kids playing games, fitting for a Facebook community group post."

6.  Pinterest: 
   * Purpose: ** Inspiration, DIYs, recipes, and mood boards.
    Prompt Attributes:  Emphasize creativity, inspiration, and how-to visuals.
   * Example: ** "Illustration of a step-by-step DIY craft project, showcasing materials, and the final product, perfect for a Pinterest pin."

7.  YouTube: 
   * Purpose: ** Long-form video content ranging from entertainment to tutorials.
    Prompt Attributes:  Create thumbnails or visuals that encapsulate the video's theme and are attention-grabbing.
    Example:  "Illustration of a person in front of a computer, with graphics of video editing tools around them, suitable for a YouTube tutorial on video editing."

When crafting prompts for each channel, always consider the platform's primary audience, content format, and purpose. Tailor your visuals to resonate with the users of that specific platform and align with the content type they expect to see.

Using the provided audience segmentation types, you can craft a detailed and targeted image prompt. Let's break down how to incorporate each segmentation type into the prompt:

1. ** Demographic Segmentation: *
   Utilize outward-facing attributes to describe individuals or groups in the image.
    Example (based on hypothetical data):  "A middle-aged married woman"

2.  Behavioral Segmentation or Persona: 
   Integrate actions or habits that resonate with the audience's behavior.
   *Example (based on hypothetical data): ** "who frequently shops online, actively engages on social media, and enjoys mobile gaming on her tablet"

3.  Psychographic or Attitudinal Segmentation: 
   Infuse elements that align with the audience's interests, preferences, and values.
   *Example (based on hypothetical data): ** "She has a preference for eco-friendly brands, enjoys mystery movies, and values sustainability and wellness."

4.  Geographic Segmentation: 
   Set the scene in a location that matches the audience's geographic region.
    Example (based on hypothetical data):  "She is situated in a cozy apartment in downtown Toronto, Canada."

*Final Prompt: **

"A middle-aged married woman who frequently shops online, actively engages on social media, and enjoys mobile gaming on her tablet. She has a preference for eco-friendly brands, enjoys mystery movies, and values sustainability and wellness. She is situated in a cozy apartment in downtown Toronto, Canada."

This prompt provides a comprehensive view of the target audience, painting a vivid picture that encompasses demographic, behavioral, psychographic, and geographic attributes.

However, the granularity of the prompt will depend on the specificity of the data the user has provided. The more detailed the data, the more tailored the prompt can be, allowing for a more targeted image generation.

There are generic guidelines. Use the user-provided information. Use the user-provided information and your expertise as an AI Assistant in generating good prompts for the generation of images with Dall-e or Stable Diffusion to help generate the same.

The user can provide additional information with user instructions for the CGS to generate images. This information may be derived from information about products, audiences, etc., configured by the user on DGS.

Further, the prompt generator 708 may access prompts from a prompt corpus 722 that includes a curated set of prompts that perform well for specific scenarios. The prompt corpus 722 is a database of the best prompts that we have carefully selected and tested. By combining the prompt corpus with the template and user inputs, a quality prompt is selected for use.

After the generated item 716 is generated, an optional operation 718 of content postprocessing may be performed to modify or block the newly generated item 716, resulting in a processed new item 720. The generated item 716 may be post-processed for various reasons, including improving accuracy and consistency (e.g., checking for factual errors, grammatical mistakes, or inconsistencies in style or format); enhancing quality and relevance (e.g., removing irrelevant or redundant content, improving coherence and flow, ensure that the output aligns with the intended purpose); enhancing output (e.g., polish wording, improve images, ensure that the style matches the desired effect); personalizing the newly generated item 716; and ensuring ethical and responsible use.

The generated item 716 is new content, and it does not refer to content that is the result of editing or changing existing material (e.g., editing an image to include text within is not considered GAI-generated new content). One difference between the generated item 716 and material created with editing tools is that the newly generated item 716 is entirely new content, while the editing tool modifies existing content or creates the content one instruction at a time. Another difference is that the GAI model 712 can produce highly creative and imaginative content, while editing tools focus on enhancing the existing content based on user commands. Another difference is that the GAI model 712 can generate content rapidly, while the editing tools require more time and effort for thorough editing and refinement.

Figure 8:
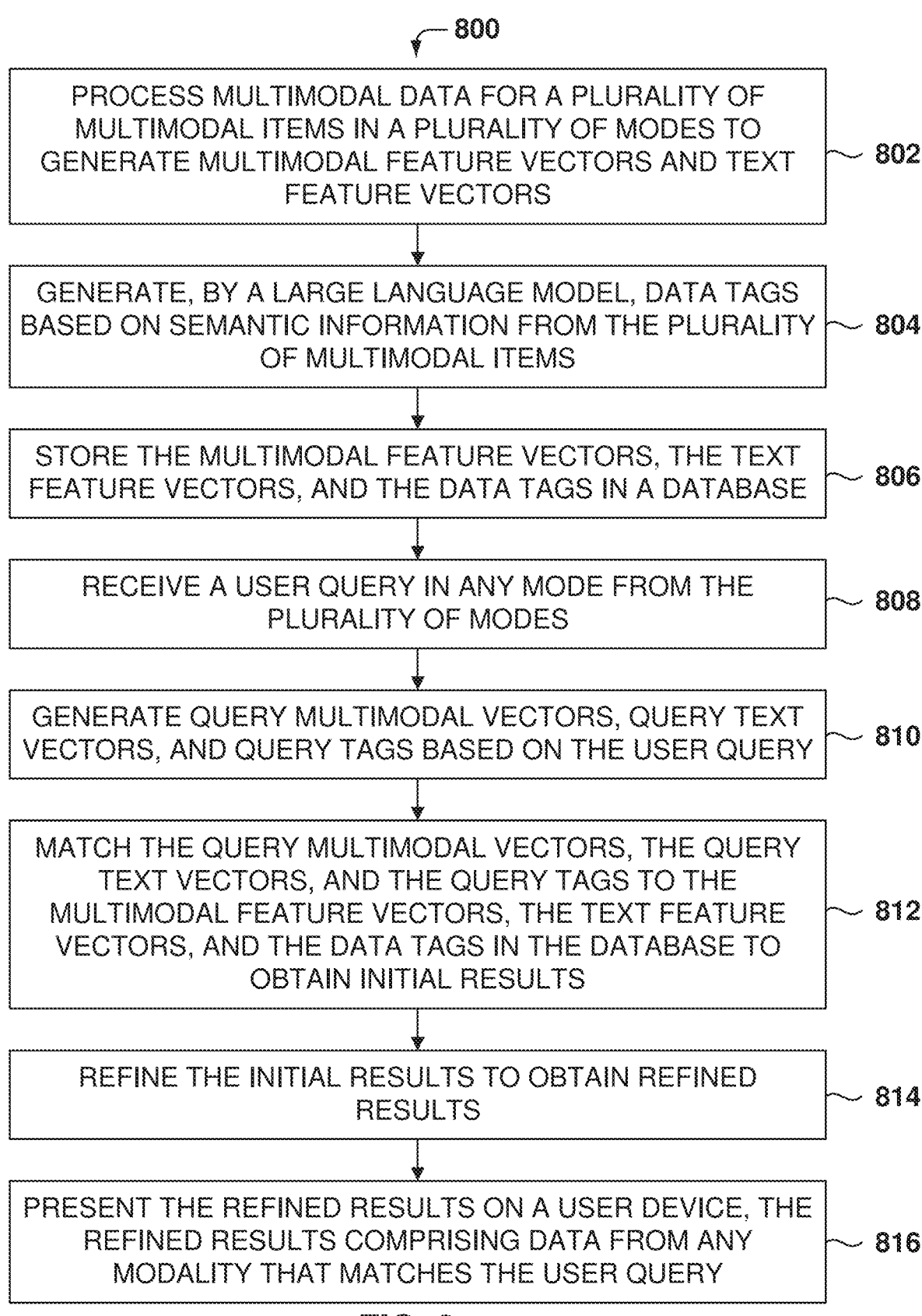
FIG. 8 is a flowchart of a method for searching multimodal items based on an input that may include one of several modalities, according to some examples.

FIG. 8 is a flowchart of a method 800 for searching multimodal items based on an input that may include one of several modalities, according to some examples. While the various operations in this flowchart are presented and described sequentially, one of ordinary skill will appreciate that some or all of the operations may be executed in a different order, be combined or omitted, or be executed in parallel.

At operation 802, the method 800 processes multimodal data for a plurality of multimodal items in a plurality of modes to generate multimodal feature vectors and text feature vectors. The multimodal data may include images, videos, audio, text, or other modalities.

From operation 802, the method 800 flows to operation 804, where a large language model generates data tags based on semantic information from the plurality of multimodal items. In some examples, the large language model extracts structured tags that represent high-level concepts, categories, or keywords associated with the multimodal data. These tags may include attributes such as brand references, scenarios, emotions, or domain-specific metadata. The tags provide an additional layer of semantic categorization, enabling filtering and enhancing the relevance of search results.

From operation 804, the method 800 flows to operation 806, where the multimodal feature vectors, text feature vectors, and data tags are stored in a database. In some examples, the database is a vector database optimized for high-speed indexing and retrieval operations. The vector database facilitates efficient matching between query embeddings and stored embeddings, leveraging Elastic Search mechanisms to identify relevant results based on vector proximity and tag alignment.

From operation 806, the method 800 flows to operation 808, where a user query is received in any mode from the plurality of modes. The query may be submitted in the form of text, image, audio, video, or other modalities.

From operation 808, the method 800 flows to operation 810, where query multimodal vectors, query text vectors, and query tags are generated based on the user query. In some examples, the query processing module extracts structured representations from the user query. The multimodal embedding model encodes the semantics of the query within the same feature space as the multimodal data, while the text embedding model maps the textual component of the query into a text-specific latent space. Additionally, the large language model generates query tags by breaking down the query into predefined tags consistent with those utilized within the vector database.

From operation 810, the method 800 flows to operation 812, where the query multimodal vectors, query text vectors, and query tags are matched to the multimodal feature vectors, text feature vectors, and data tags in the database to obtain initial results.

From operation 812, the method 800 flows to operation 814, where the initial results are refined to obtain refined results. In some examples, a refinement module prioritizes and re-ranks the matched results based on additional criteria, such as tag relevance, semantic coherence, or domain-specific considerations. The refinement process may involve combining scores from vector-based and tag-based matching to generate a final ranking of the search results.

From operation 814, the method flows to operation 816, where the refined results are presented on a user device. The refined results comprise data from any modality that matches the user query. In some examples, the results may include video clips, images, audio files, text snippets, or other multimodal data that align with the query intent.

In view of the disclosure above, various examples are set forth below. It should be noted that one or more features of an example, taken in isolation or combination, should be considered within the disclosure of this application.

Example 1. A computer-implemented method comprising: processing multimodal data for a plurality of multimodal items in a plurality of modes to generate multimodal feature vectors and text feature vectors; generating, by a large language model, data tags based on semantic information from the plurality of multimodal items; storing the multimodal feature vectors, the text feature vectors, and the data tags in a database; receiving a user query in any mode from the plurality of modes; generating query multimodal vectors, query text vectors, and query tags based on the user query; matching the query multimodal vectors, the query text vectors, and the query tags to the multimodal feature vectors, the text feature vectors, and the data tags in the database to obtain initial results; refining the initial results to obtain refined results; and presenting the refined results on a user device, the refined results comprising data from any modality that matches the user query.

Example 2. The method of Example 1, wherein processing the multimodal data further comprises: employing a domain-specific semantic extraction module configured to identify objects, scenes, and brand references within the multimodal data.

Example 3. The method of any one or more of Examples 1-2, wherein generating data tags further comprises: obtaining tags representing at least one of brand, scenario, emotion, or domain-specific attribute.

Example 4. The method of any one or more of Examples 1-3, wherein matching the query multimodal vectors, query text vectors, and query tags further comprises: performing similarity computations using at least one of cosine similarity or Euclidean distance.

Example 5. The method of any one or more of Examples 1-4, wherein refining the initial results further comprises: re-ranking the initial results based on one or more of tag alignment, semantic coherence, or domain-specific criteria.

Example 6. The method of any one or more of Examples 1-5, wherein processing the multimodal data further comprises: converting audio data to text using text-to-speech conversion and extracting textual content from images or videos using optical character recognition.

Example 7. The method of any one or more of Examples 1-6, wherein the plurality of modes comprises video clips, images, audio files, text snippets, sketches, and point clouds.

Example 8. The method of any one or more of Examples 1-7, wherein processing the multimodal data further comprises: extracting and indexing video segments as separate multimodal items.

Example 9. The method of any one or more of Examples 1-8, further comprising: generating a prompt based on one or more refined results and the user query; and providing the prompt to a generative artificial intelligence model to generate new content.

Example 10. The method of any one or more of Examples 1-9, wherein the refined results comprise items in two or more modalities.

Example 11. A system comprising: a memory comprising instructions; and one or more computer processors, the instructions, when executed by the one or more computer processors, causing the system to perform operations comprising: processing multimodal data for a plurality of multimodal items in a plurality of modes to generate multimodal feature vectors and text feature vectors; generating, by a large language model, data tags based on semantic information from the plurality of multimodal items; storing the multimodal feature vectors, the text feature vectors, and the data tags in a database; receiving a user query in any mode from the plurality of modes; generating query multimodal vectors, query text vectors, and query tags based on the user query; matching the query multimodal vectors, the query text vectors, and the query tags to the multimodal feature vectors, the text feature vectors, and the data tags in the database to obtain initial results; refining the initial results to obtain refined results; and presenting the refined results on a user device, the refined results comprising data from any modality that matches the user query.

Example 12. The system of Example 11, wherein processing the multimodal data further comprises:

employing a domain-specific semantic extraction module configured to identify objects, scenes, and brand references within the multimodal data.

Example 13. The system of any one or more of Examples 11-12, wherein generating data tags further comprises: obtaining tags representing at least one of brand, scenario, emotion, or domain-specific attribute.

Example 14. The system of any one or more of Examples 11-13, wherein matching the query multimodal vectors, query text vectors, and query tags further comprises: performing similarity computations using at least one of cosine similarity or Euclidean distance.

Example 15. The system of any one or more of Examples 11-14, wherein refining the initial results further comprises: re-ranking the initial results based on one or more of tag alignment, semantic coherence, or domain-specific criteria.

Example 16. A non-transitory machine-readable storage medium including instructions that, when executed by a machine, cause the machine to perform operations comprising: processing multimodal data for a plurality of multimodal items in a plurality of modes to generate multimodal feature vectors and text feature vectors; generating, by a large language model, data tags based on semantic information from the plurality of multimodal items; storing the multimodal feature vectors, the text feature vectors, and the data tags in a database; receiving a user query in any mode from the plurality of modes; generating query multimodal vectors, query text vectors, and query tags based on the user query; matching the query multimodal vectors, the query text vectors, and the query tags to the multimodal feature vectors, the text feature vectors, and the data tags in the database to obtain initial results; refining the initial results to obtain refined results; and presenting the refined results on a user device, the refined results comprising data from any modality that matches the user query.

Example 17. The non-transitory machine-readable storage medium of Example 16, wherein processing the multimodal data further comprises: employing a domain-specific semantic extraction module configured to identify objects, scenes, and brand references within the multimodal data.

Example 18. The non-transitory machine-readable storage medium of any one or more of Examples 16-17, wherein generating data tags further comprises: obtaining tags representing at least one of brand, scenario, emotion, or domain-specific attribute.

Example 19. The non-transitory machine-readable storage medium of any one or more of Examples 16-18, wherein matching the query multimodal vectors, query text vectors, and query tags further comprises: performing similarity computations using at least one of cosine similarity or Euclidean distance.

Example 20. The non-transitory machine-readable storage medium of any one or more of Examples 16-19, wherein refining the initial results further comprises: re-ranking the initial results based on one or more of tag alignment, semantic coherence, or domain-specific criteria.

Figure 9:
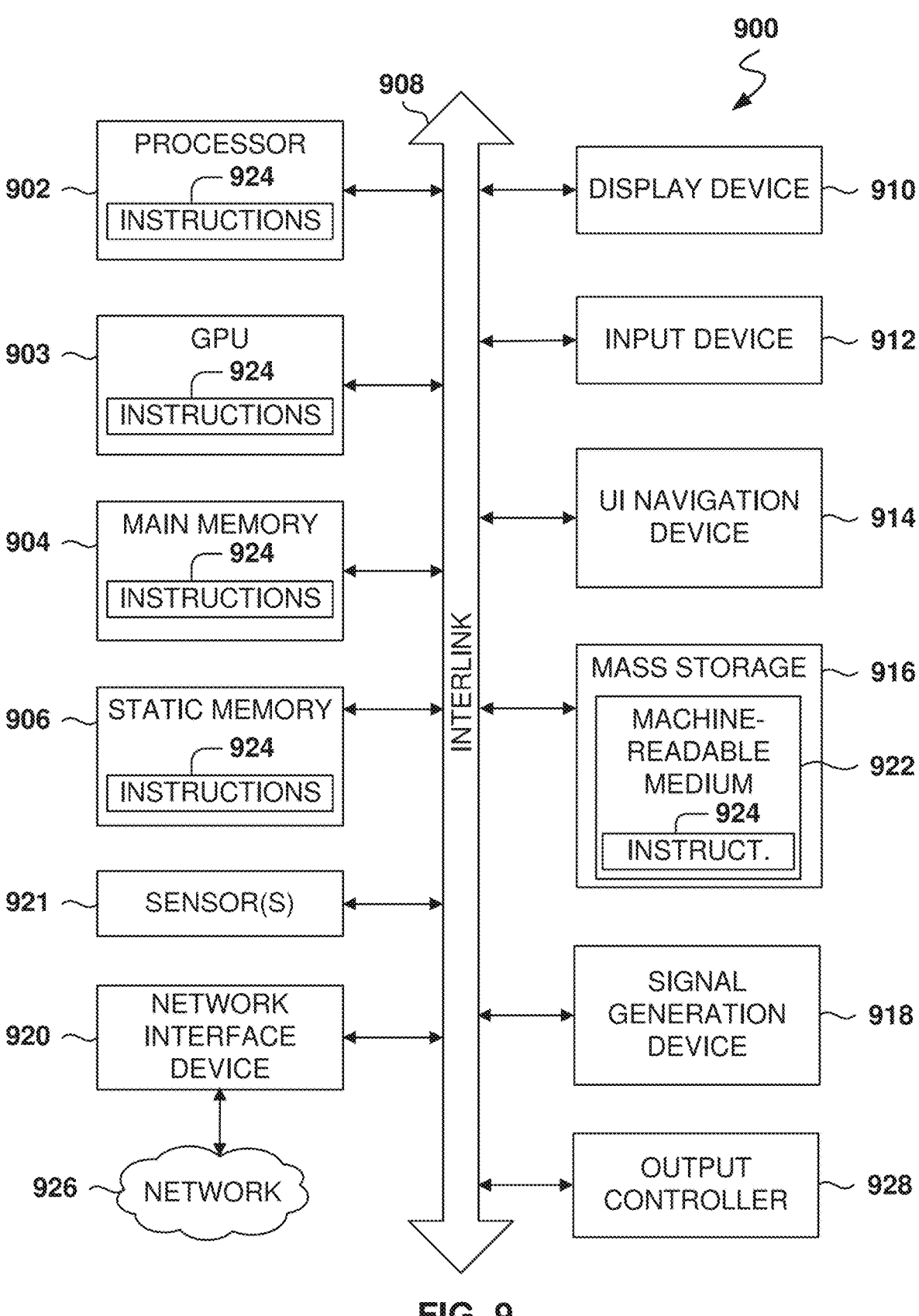
FIG. 9 is a block diagram illustrating an example of a machine upon by which one or more process examples described herein may be implemented or controlled.

FIG. 9 is a block diagram illustrating an example of a machine 900 upon by which one or more process examples described herein may be implemented or controlled. In alternative examples, the machine 900 may operate as a standalone device or be connected (e.g., networked) to other machines. In a networked deployment, the machine 900 may operate in the capacity of a server machine, a client machine, or both in server-client network environments. In an example, the machine 900 may act as a peer machine in a peer-to-peer (P2P) (or other distributed) network environment. Further, while only a single machine 900 is illustrated, the term "machine" shall also be taken to include any collection of machines that individually or jointly execute a set (or multiple sets) of instructions to perform any one or more of the methodologies discussed herein, such as via cloud computing, software as a service (Saas), or other computer cluster configurations.

Examples, as recited herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 900 (e.g., computer system) may include a hardware processor 902 (e.g., a central processing unit (CPU), a hardware processor core, or any combination thereof), a graphics processing unit (GPU 903), a main memory 904, and a static memory 906, some or all of which may communicate with each other via an interlink 908 (e.g., bus). The machine 900 may further include a display device 910, an alphanumeric input device 912 (e.g., a keyboard), and a user interface (UI) navigation device 914 (e.g., a mouse). In an example, the display device 910, alphanumeric input device 912, and UI navigation device 914 may be a touch screen display. The machine 900 may additionally include a mass storage device 916 (e.g., drive unit), a signal generation device 918 (e.g., a speaker), a network interface device 920, and one or more sensors 921, such as a Global Positioning System (GPS) sensor, compass, accelerometer, or another sensor. The machine 900 may include an output controller 928, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 902 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 902 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 902 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 902 may be emulated in software, running on a physical processor, as a virtual processor or virtual circuit. The virtual processor may behave like an independent processor but is implemented in software rather than hardware.

The mass storage device 916 may include a machine-readable medium 922 on which one or more sets of data structures or instructions 924 (e.g., software) embodying or utilized by any of the techniques or functions described herein. The instructions 924 may also reside, completely or at least partially, within the main memory 904, within the static memory 906, within the hardware processor 902, or the GPU 903 during execution thereof by the machine 900. For example, one or any combination of the hardware processor 902, the GPU 903, the main memory 904, the static memory 906, or the mass storage device 916 may constitute machine-readable media.

While the machine-readable medium 922 is illustrated as a single medium, the term "machine-readable medium" may include a single medium or multiple media (e.g., a centralized or distributed database and associated caches and servers) configured to store one or more instructions 924.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The term "machine-readable medium" may include any medium that is capable of storing, encoding, or carrying instructions 924 for execution by the machine 900 and that causes the machine 900 to perform any one or more of the techniques of the present disclosure or that is capable of storing, encoding, or carrying data structures used by or associated with such instructions 924. Non-limiting machine-readable medium examples may include solid-state memories and optical and magnetic media. For example, a massed machine-readable medium comprises a machine-readable medium 922 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media.

The instructions 924 may be transmitted or received over a communications network 926 using a transmission medium via the network interface device 920. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 924 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:

processing multimodal data for a plurality of multimodal items in a plurality of modes to generate multimodal feature vectors and text feature vectors, the plurality of modes comprising text snippets, images, videos, and audios, wherein the multimodal feature vectors represent semantic characteristics in a unified vector space to capture cross-modal relationships for the text snippets, images, videos, and audios, the text feature vectors optimized for textual semantics and mapped into a separate latent space from the multimodal feature vectors;

generating, by a large language model, data tags based on semantic information from the plurality of multimodal items, each data tag representing an attribute associated with a corresponding multimodal item;

storing the multimodal feature vectors, the text feature vectors, and the data tags in a database;

receiving a user query in any mode from the plurality of modes;

generating a query multimodal vector, a query text vector, and one or more query tags based on the user query;

matching the query multimodal vector, the query text vector, and the one or more query tags to the multimodal feature vectors, the text feature vectors, and the data tags in the database to obtain initial results:

refining the initial results to obtain refined results, wherein refining the initial results comprises combining scores from multimodal vector matching and scores from text feature vector matching, and reranking the initial results based on the combination of scores; and presenting the refined results on a user device, the refined results comprising data from any modality that matches the user query.

2. The method as recited in claim 1, wherein processing the multimodal data further comprises:

employing a domain-specific semantic extraction module configured to identify objects, scenes, and brand references within the multimodal data.

3. The method as recited in claim 1, wherein generating data tags further comprises:

obtaining tags representing at least one of brand, scenario, or emotion.

4. The method as recited in claim 1, wherein matching the query multimodal vectors, query text vectors, and query tags further comprises:

performing a similarity calculation between the query multimodal vector and the multimodal feature vectors using cosine similarity or Euclidean distance;

performing a similarity calculation between the query text vector and the text feature vectors; and performing a similarity calculation between the one or more query tags and the data tags.

5. The method as recited in claim 1, wherein refining the initial results further comprises:

re-ranking the initial results based on one or more of tag alignment, semantic coherence, or domain-specific criteria.

6. The method as recited in claim 1, wherein processing the multimodal data further comprises:

converting audio data to text using text-to-speech conversion and extracting textual content from images or videos using optical character recognition.

7. The method as recited in claim 1, wherein the plurality of modes further comprises sketches, and point clouds.

8. The method as recited in claim 1, wherein processing the multimodal data further comprises:

extracting and indexing video segments as separate multimodal items.

9. The method as recited in claim 1, further comprising:

generating a prompt based on one or more refined results and the user query; and providing the prompt to a generative artificial intelligence model to generate new content.

10. The method as recited in claim 1, wherein the refined results comprise items in two or more modalities.

11. A system comprising:

a memory comprising instructions; and one or more computer processors, the instructions, when executed by the one or more computer processors, causing the system to perform operations comprising:

processing multimodal data for a plurality of multimodal items in a plurality of modes to generate multimodal feature vectors and text feature vectors, the plurality of modes comprising text snippets, images, videos, and audios, wherein the multimodal feature vectors represent semantic characteristics in a unified vector space to capture cross-modal relationships for the text snippets, images, videos, and audios, the text feature vectors optimized for textual semantics and mapped into a separate latent space from the multimodal feature vectors;

generating, by a large language model, data tags based on semantic information from the plurality of multimodal items, each data tag representing an attribute associated with a corresponding multimodal item;

storing the multimodal feature vectors, the text feature vectors, and the data tags in a database;

receiving a user query in any mode from the plurality of modes;

generating a query multimodal vector, a query text vector, and one or more query tags based on the user query;

matching the query multimodal vector, the query text vector, and the one or more query tags to the multimodal feature vectors, the text feature vectors, and the data tags in the database to obtain initial results;

refining the initial results to obtain refined results, wherein refining the initial results comprises combining scores from multimodal vector matching and scores from text feature vector matching, and reranking the initial results based on the combination of scores; and presenting the refined results on a user device, the refined results comprising data from any modality that matches the user query.

12. The system as recited in claim 11, wherein processing the multimodal data further comprises:

employing a domain-specific semantic extraction module configured to identify objects, scenes, and brand references within the multimodal data.

13. The system as recited in claim 11, wherein generating data tags further comprises:

obtaining tags representing at least one of brand, scenario, or emotion.

14. The system as recited in claim 11, wherein matching the query multimodal vectors, query text vectors, and query tags further comprises:

performing a similarity calculation between the query multimodal vector and the multimodal feature vectors using cosine similarity or Euclidean distance;

performing a similarity calculation between the query text vector and the text feature vectors; and performing a similarity calculation between the one or more query tags and the data tags.

15. The system as recited in claim 11, wherein refining the initial results further comprises:

re-ranking the initial results based on one or more of tag alignment, semantic coherence, or domain-specific criteria.

16. A non-transitory machine-readable storage medium including instructions that, when executed by a machine, cause the machine to perform operations comprising:

processing multimodal data for a plurality of multimodal items in a plurality of modes to generate multimodal feature vectors and text feature vectors, the plurality of modes comprising text snippets, images, videos, and audios, wherein the multimodal feature vectors represent semantic characteristics in a unified vector space to capture cross-modal relationships for the text snippets, images, videos, and audios, the text feature vectors optimized for textual semantics and mapped into a separate latent space from the multimodal feature vectors;

generating, by a large language model, data tags based on semantic information from the plurality of multimodal items, each data tag representing an attribute associated with a corresponding multimodal item;

storing the multimodal feature vectors, the text feature vectors, and the data tags in a database;

receiving a user query in any mode from the plurality of modes;

generating a query multimodal vector, a query text vector, and one or more query tags based on the user query;

matching the query multimodal vector, the query text vector, and the one or more query tags to the multimodal feature vectors, the text feature vectors, and the data tags in the database to obtain initial results;

refining the initial results to obtain refined results, wherein refining the initial results comprises combining scores from multimodal vector matching and scores from text feature vector matching, and reranking the initial results based on the combination of scores; and presenting the refined results on a user device, the refined results comprising data from any modality that matches the user query.

17. The non-transitory machine-readable storage medium as recited in claim 16, wherein processing the multimodal data further comprises:

employing a domain-specific semantic extraction module configured to identify objects, scenes, and brand references within the multimodal data.

18. The non-transitory machine-readable storage medium as recited in claim 16, wherein generating data tags further comprises:

obtaining tags representing at least one of brand, scenario, or emotion.

19. The non-transitory machine-readable storage medium as recited in claim 16, wherein matching the query multimodal vectors, query text vectors, and query tags further comprises:

performing a similarity calculation between the query multimodal vector and the multimodal feature vectors using cosine similarity or Euclidean distance;

performing a similarity calculation between the query text vector and the text feature vectors; and performing a similarity calculation between the one or more query tags and the data tags.

20. The non-transitory machine-readable storage medium as recited in claim 16, wherein refining the initial results further comprises:

re-ranking the initial results based on one or more of tag alignment, semantic coherence, or domain-specific criteria.

* * * * *